United States Patent Office 3,239,560
Patented Mar. 8, 1966

3,239,560
METHOD FOR PREPARATION OF HALIDE HYDROXYSULFONATE
Cushman M. Cambre and Kenneth W. Theile, Cincinnati, Ohio, assignors to The Procter & Gamble Company, Cincinnati, Ohio, a corporation of Ohio
No Drawing. Filed Mar. 5, 1962, Ser. No. 177,198
10 Claims. (Cl. 260—513)

This invention relates to an improved method for preparing valuable intermediates useful in the preparation of exceptionally effective organic synthetic detergent surfactants. More particularly, this invention relates to a new and improved method for the preparation of a halide hydroxysulfonate, and more specifically alkali metal 1-chloro-2-hydroxy propane-3-sulfonate.

The desired end product has the following formula $$Cl-\underset{\underset{H}{|}}{\overset{\overset{H}{|}}{C}}-\underset{\underset{H}{|}}{\overset{\overset{OH}{|}}{C}}-\underset{\underset{H}{|}}{\overset{\overset{H}{|}}{C}}-\overset{\overset{O}{\|}}{\underset{\underset{O}{\|}}{S}}-O-M$$

wherein M is an alkali metal such as sodium, potassium and lithium, and is an art-recognized valuable intermediate useful in the synthesis of a great number of mono- and disulfonic acid derivatives. The preferred compound is the sodium derivative. Such a compound is referred to in the literature interchangeably as sodium 1-chloro-2-hydroxy propane-3-sulfonate, and sodium salt of 3-chloro-2-hydroxy-1-propane sulfonic acid, or more simply, as the sodium salt of glycerol alpha-monochlorohydrin sulfonic acid. For the purposes of this invention, the preferred nomenclature will be sodium 1-chloro-2-hydroxy propane - 3 - sulfonate, and will be written as CH$_2$ClCHOHCH$_2$SO$_3$Na or abbreviated as CHS.

As mentioned above this compound has long been known but the prior art methods for its preparation have generally been regarded as unsatisfactory. One reason for this is that the prior art methods were relatively slow and took anywhere from several hours to a few days. This somewhat tended to discourage research interest with this compound and its reaction product since the shortcomings of the prior art method were so well recognized. One such prior art method that was considered too slow to constitute a commercially acceptable process comprised interaction of epichlorohydrin and sodium bisulfite in an aqueous medium. As mentioned, this reaction proceeded too slowly for commercial standards and, in addition, offered relatively low percentages of conversion and yields.

It has recently been discovered that an outstanding class of sulfo-betaine type of detergent surfactants can be prepared by reacting sodium 1-chloro-2-hydroxy propane-3-sulfonate with long chain alkyl dimethyl tertiary amines. This quaternization reaction proceeds according to the following equation:

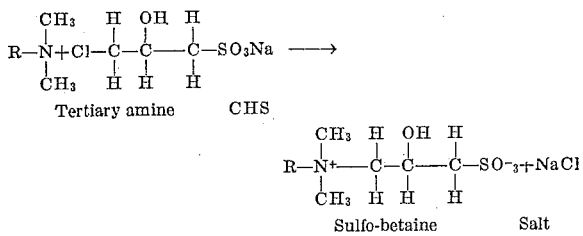

The extraordinary cleaning efficiency of the organic sultaine detergent surfactants prepared by using CHS as a starting material made it necessary to discover a new process for CHS preparation that was relatively simple, inexpensive and swift with attendant high yields of a high quality product.

It is therefore the principal object of this invention to provide such an improved process. Other objects will become apparent from the ensuing description.

Such an improved process has now been made possible by the present invention. Basically, the method calls for interreacting epichlorohydrin and a carefully proportioned alkali metal bisulfite-sulfite mixture in an inert atmosphere. It has now been surprisingly discovered that if the epichlorohydrin-sodium bisulfite reaction referred to above is modified by substituting for the sodium bisulfite a delicately balanced mixture of sodium bisulfite and sodium sulfite an unexpectedly efficient reaction is obtained. The reaction proceeds swiftly and results in very high yields of a pure product which may be used directly in the production of a desired sultaine organic surfactant without any intermediate purification or treatment steps.

An equation for the new reaction is

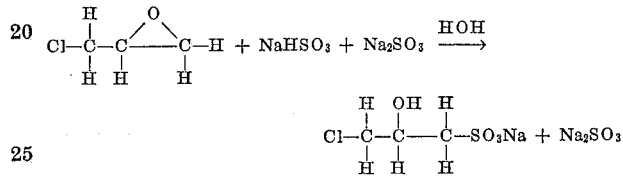

It has been discovered that the alkali metal sulfite must be present in the alkali metal bisulfite-sulfite mixture on a molar basis in the range of from about 1 to about 5 mole percent of the mixture. A preferred mixture is that in which the alkali metal sulfite is in the range of from about 2 to 3.5 mole percent of the mixture. Under the prescribed process conditions comparably high percentages of bisulfite conversions are obtained, i.e., in the neighborhood of 97% to 99% and higher. These exceptionally high yields and conversion figures illustrated in the examples below while not necessarily interdependent do reflect the exceptional efficiency of the novel reaction system when the critically prescribed ratios of the reactants and reaction conditions are adhered to.

The reaction proceeds equally well if either the epichlorohydrin ingredient or the sulfur dioxide containing species is present in slight excesses or when equimolar amounts of the reactants are employed. A convenient method employs the epichlorohydrin in a slight excess of say 3 to 6% mole percent over the sulfur dioxide containing species.

It is essential, however, that the reaction be conducted in the absence of an oxidizing agent such as air, or oxygen and more generally in the absence of free radical promoters. While the reaction will not be completely destroyed when performed in other than an inert atmosphere, the reaction will be slowed down so much as to be regarded only comparable to prior art methods which have been found unsuitable. Thus, the reaction proceeds well under a nitrogen blanket, or in a steam atmosphere. Generally any of the inert nonreactive gases can be employed such as helium, argon, neon, and crypton. When this precaution is not observed, the yield of 1-chloro-2-hydroxy propane-3-sulfonate is markedly reduced and the rate of reaction is also quite adversely affected.

The reaction is a highly exothermic one and this is a factor which has received considerable attention. The temperature range of the reaction is between about 60° C. to 110° C. A more narrow range of about 75° C. to about 100° C., is preferred. If the temperature is allowed to go above about 110° C., the reaction product tends to decompose and discolor. It is essential, therefore, to conduct the reaction within the prescribed temperature range and to take necessary measures to deal with the exothermic nature of the reaction. Any means may be used to accomplish this, such as external or internal cooling means. An example of an external cooling device is an ordinary ice bath, surrounding the reaction zone and it has been found to work well.

Another modification of an external cooling system which has been found acceptable under some conditions is a heat exchanger cooling coil immersed in the reaction mixture. This method has as a slight shortcoming the tendency of the sulfonate reaction product to form deposits on the cooling coil and build up a film thereon with poor heat transfer characteristics.

The more preferred method of controlling the reaction temperature is by so-called internal cooling means in which an inert compound having a relatively low boiling point, i.e., between about 60° C. and 100° C. is added to the initial reactants in an amount which is 15% to 60% of the epichlorohydrin level. The most promising method of heat removal appears to be the use of lower alcohols such as methanol as an internal coolant, and preferably at a level of 25% to 35% of the epichlorohydrin usage.

The effectiveness of methanol which is the preferred lower alcohol is based on its exceptionally low boiling temperature. As the exothermic nature of the reaction raises the temperature to the boiling point of the methanol, the methanol vaporizes, is led to a condenser, and recycled back to the reaction mixture.

Other low boiling point internal coolants which do not form by-products which affect the preferred reaction can be used. Examples of other suitable materials are: ethanol, isopropanol and acetone. Inert materials which have boiling points below the minimum temperature of the reaction are preferably avoided in large quantities.

The reaction is performed in an aqueous medium wherein the water can be present in a range of about 30% to 80% by weight based on the entire system. It is preferred to operate with a range of about 40% to 60%.

An important and necessary facet of this invention relates to the necessity of keeping the reactants in a constant state of agitation. In the absence of such agitation there would exist a two phase system which would slow down the reaction to an intolerable degree preventing the reaction from attaining the degree of completeness otherwise possible by this invention. At the reaction temperature, epichlorohydrin ordinarily is soluble in water to a 10% level, but there are indications that the 40% to 50% $NaHSO_3$ solution which exists during the reaction will solubilize only 2 to 3% epichlorohydrin. Therefore, in order to obtain short reaction times and high yields it is necessary to achieve good dispersion of the epichlorohydrin in the continuous aqueous phase. Good dispersion of very small droplets serves to expose a maximum of surface area and allow a faster rate of transfer of the epichlorohydrin into the aqueous phase in which the reaction occurs.

The reaction requires the hydrogen ion concentration to be in a range of fairly strongly acid to a neutral solution, or more generally from a pH range of 3 to about 7. While the reaction may proceed to a slightly alkaline condition such as a pH of 8, higher pH values should definitely be avoided. The danger at these higher pH concentrations is that a highly alkaline reaction mixture favors the hydrolysis or streckerization of the chlorine atom and prevents the formation of the desired 1-chloro-2-hydroxy propane-3-sulfonate. The reaction is optimized at a preferred range of between 4 to 6.

The unexpected speed of the reaction has been referred to above in terms of being one of the major contributions of this invention. In fact, it begins virtually immediately upon mixing of the reactants and proceeds to completion within approximately the first thirty minutes at which time the product may very readily be recovered at yields of about 97 to 99%, and higher.

The duration of the reaction may extend from about 15 minutes up to about 60 minutes. No substantial advantage is apparent in letting the reaction last longer than 60 minutes. The preferred range is between 25 to 35 minutes.

The alkali metal bisulfite-sulfite mixture can be formed from any of the available alkali metals such as potassium, sodium, and lithium.

The alkali metal bisulfite-sulfite mixture can be present at the start of the reaction in the required amounts, and this is the preferred method of carrying out this invention. As an alternative, however, the alkali metal sulfite can be added at a point after the alkali metal bisulfite-epichlorohydrin reaction has been initiated. Comparable results are obtained in either event. Since there seems to be no advantage in such a delayed addition of the sodium sulfite ingredient, the more preferred method is to have all of the ingredients present at the start of the reaction including the internal coolant. In fact, it has been shown that the reaction proceeds more swiftly and slightly higher yields are obtained when the reactants are all initially present.

The reaction product is in the form of a solution or a relatively thick slurry of principally 1-chloro-2-hydroxy propane-3-sulfonate, water and, if used, alcohol. This reaction product mixture can be employed directly in a process of preparing an organic sulfo-betaine type detergent sufactant according to the reaction given above. If the halide hydroxy propane sulfonate is to be isolated, this can easily be accomplished. One method found adaptable is by a series of filtrations at successively lower temperatures. Another method equally effective and productive of high yields is by centrifugation.

The following examples are presented as being illustrative of the invention and are not to be interpreted as in any way limiting it.

In the following examples, it will be noted that the sodium metabisulfite salt is employed as the source of the bisulfite ion. Sodium metabisulfite, $Na_2S_2O_5$, is the anhydrous form of sodium bisulfite and was used in the following examples because of its commercial availability and the advantage it offers of stability against oxidation. In the reaction system, the sodium metabisulfite reacts with the water and produces two moles of sodium bisulfite per each mole of metabisulfite used.

*Example I*

158.9 parts of sodium metabisulfite (1.63 moles as sodium bisulfite) and 336 parts of water were mixed under a nitrogen blanket while heating to 80° C. To this, 5.1 parts of sodium sulfite (.04 mole) were added along with 158 parts (1.67 moles) of epichlorohydrin. An ice-water bath was used to maintain the temperature at 80° C. and the system was vigorously agitated. Thirty minutes after the epichlorohydrin was added the reaction mix was cooled, and volatiles (primarily steam) were removed under vacuum. 347.7 parts of white, crystalline material was recovered. The product contained 5.02% moisture, 0.02% sulfite, and had a saponification value of 264.1; the yield of 3-chloro-2-hydroxy propane 1-sulfonate (sodium) was in excess of 97%. The CHS produced by this example can be reacted with dodecyl dimethyl amine to produce a sulfo-betaine detergent compound which possesses exceptional cleaning power.

*Example II*

549.2 parts of sodium metabisulfite (5.65 moles as sodium bisulfite) and 639.3 parts of water were mixed under a nitrogen blanket while heating to 80° C. 15.4 parts of sodium sulfite (0.12 mole) was added along with 168.2 parts of methanol, and 560.6 parts (5.94 moles) of epichlorohydrin was added. The system was vigorously agitated. The volatile components in the reaction mix boiled at 81–85° C., and were condensed by means of a reflux condenser and returned to the system. Thirty minutes after the epichlorohydrin was added a sample was taken out of the reaction mixture and analyzed immediately for sodium bisulfite; the sample contained only 0.2% by weight bisulfite, which is equivalent to about 99% conversion of the bisulfite.

*Example III*

176 parts of sodium metabisulfite (1.81 moles as sodium bisulfite) and 10.2 parts of sodium sulfite (.08 mole) were mixed with 313.8 parts of water under a nitrogen blanket while heating to 70° C. 184 parts (1.95 moles) of epichlorohydrin was added. An ice-water bath was used to maintain the reaction temperature at 70° C. and vigorous agitation was maintained. Fifteen minutes after the epichlorohydrin was added a sample was taken which analyzed 0.03 bisulfite, which corresponds to a reaction conversion of over 99% of the bisulfite.

*Example IV*

159.4 parts of sodium metabisulfite (1.64 moles as sodium bisulfite) was mixed with 335.3 parts of water under a nitrogen blanket while heating to 80° C. 158.8 parts (1.68 moles) of epichlorohydrin was added; an ice-water bath was used to maintain the reaction temperature at 80° C., and vigorous agitation was applied. Ten minutes after the epichlorohydrin was added 5.3 parts (0.04 mole) of sodium sulfite were added to the system, and after 10 minutes a sample was taken which analyzed 0.44% sodium bisulfite, which corresponds to a reaction conversion of about 98.30% of the bisulfite. Analogous results are obtained if equivalent molar amounts of potassium or lithium metabisulfite and potassium or lithium sulfite are used instead of the sodium salts.

It will be appreciated that various modifications may be made in the invention described herein without deviating from the scope thereof as defined in the appended claims.

What is claimed is:
1. A process for the preparation of 1-chloro-2-hydroxy propane-3-sulfonate comprising the steps of:
   admixing and reacting, in an aqueous medium, epichlorohydrin with a mixture of alkali metal bisulfite and alkali metal sulfite, the proportion of said reactants ranging from a slight excess of epichlorohydrin to a slight excess of said alkali metal bisulfite-sulfite mixture, which mixture contains from about 2 mole percent to about 3.5 mole percent of the alkali metal sulfite with the remainder of the mixture being alkali metal bisulfite, said reaction mixture having a pH within the range of from about 3 to about 8, in an inert atmosphere and at a temperature between about 60° C. and about 110° C., for a period of about 15 to about 60 minutes, while agitating reactants sufficiently to intimately mix said reactants during the reaction.
2. The process of claim 1 wherein 1-chloro-2-hydroxy propane-3-sulonfate is recovered from the reaction products.
3. The process of claim 1 wherein the reaction temperature is in the range of about 75° C. to 100° C.
4. The process of claim 1 wherein the period of the reaction is between 25 to 35 minutes.
5. The process of claim 1 wherein water is present in a range of about 30% to 80% by weight.
6. The process of claim 1 wherein the water is present in a range of about 40% to 60% by weight.
7. The process of claim 1 wherein an internal coolant is employed to maintain the reaction temperature in the prescribed temperature range.
8. The process of claim 1 wherein the alkali metal sulfite is added after a reaction has commenced between the alkali metal bisulfite and the epichlorohydrin.
9. The process of claim 1 wherein the alkali metal is selected from the group consisting of sodium, potassium, and lithium.
10. The process of claim 1 wherein the alkali metal is sodium.

References Cited by the Examiner

UNITED STATES PATENTS

| | | | |
|---|---|---|---|
| 2,810,747 | 10/1957 | Sexton et al. | 260—513 |
| 2,820,818 | 1/1958 | Sexton et al. | 260—513 |
| 2,989,547 | 6/1961 | Whyte | 260—513 |

OTHER REFERENCES

Mayo et al.: Chem. Reviews, vol. 27, 1940, pp. 396, 397.

Suter, Organic Chemistry of Sulfur, John Wiley, New York, 1944, pp. 134, 135.

LORRAINE A. WEINBERGER, *Primary Examiner.*

LEON ZITVER, *Examiner.*